(12) United States Patent
Ueno

(10) Patent No.: US 6,617,370 B2
(45) Date of Patent: Sep. 9, 2003

(54) METHOD FOR REPAIRING THE COATED SURFACE OF A VEHICLE

(75) Inventor: Makoto Ueno, Tagajyou (JP)

(73) Assignee: Tateo Uegaki, Sendai (JP)

( * ) Notice: Subject to any disclaimer, the term of this patent is extended or adjusted under 35 U.S.C. 154(b) by 0 days.

(21) Appl. No.: 09/935,961

(22) Filed: Aug. 23, 2001

(65) Prior Publication Data

US 2002/0009552 A1 Jan. 24, 2002

Related U.S. Application Data

(62) Division of application No. 09/388,749, filed on Sep. 2, 1999.

(30) Foreign Application Priority Data

| Sep. 4, 1998 | (JP) | ............................................. 10-251427 |
| Jun. 2, 1999 | (JP) | ............................................. 11-155220 |
| Jul. 6, 1999 | (JP) | ............................................. 11-191485 |

(51) Int. Cl.[7] ................................. C08F 2/50; C08J 7/04
(52) U.S. Cl. ................................. 522/6; 522/70; 522/71; 522/79; 522/83; 522/90; 522/96; 522/104; 522/107; 522/100; 522/151; 522/150; 522/152; 522/153; 522/154; 522/103; 522/167; 522/168; 522/170; 522/173; 522/174; 522/180; 522/182
(58) Field of Search ........................ 522/100, 83, 79, 522/81, 104, 6, 96, 103, 90, 107, 150, 151–154, 167–170, 173–174, 180, 182, 71

(56) References Cited

U.S. PATENT DOCUMENTS

| 3,738,441 | A | | 6/1973 | Kenner |
| 4,012,543 | A | * | 3/1977 | Ranger et al. ............... 427/361 |
| 4,264,483 | A | * | 4/1981 | Laufer et al. ................. 522/10 |
| 4,308,118 | A | | 12/1981 | Dudgeon |
| 4,353,463 | A | * | 10/1982 | Seemann .................... 206/220 |
| 4,654,262 | A | | 3/1987 | Alonso |
| 4,668,529 | A | * | 5/1987 | Blair ............................ 427/142 |
| 4,750,578 | A | | 6/1988 | Brandenfels |
| 4,751,129 | A | * | 6/1988 | Ramalingam et al. ...... 427/386 |
| 4,780,434 | A | * | 10/1988 | Watanabe et al. ........... 501/100 |
| 4,855,334 | A | * | 8/1989 | Maruyama et al. ........... 522/96 |
| 4,960,611 | A | | 10/1990 | Fujisawa et al. |
| 5,166,007 | A | * | 11/1992 | Smith et al. ................. 427/140 |
| 5,420,205 | A | * | 5/1995 | Becker et al. ............... 523/500 |
| 5,554,666 | A | * | 9/1996 | Livesay ......................... 522/81 |
| 5,650,867 | A | | 7/1997 | Kojima et al. |
| 5,789,459 | A | * | 8/1998 | Inagaki et al. ................. 522/16 |
| 6,277,898 | B1 | * | 8/2001 | Pachl et al. .................. 522/100 |

FOREIGN PATENT DOCUMENTS

| DE | 31 28 112 A1 | 2/1983 |
| DE | 196 46 956 | 5/1998 |
| EP | 0 333 934 | 9/1989 |
| EP | 0 799 649 A1 | 10/1997 |
| GB | 1066691 | 4/1967 |
| JP | 60-30690 | 7/1985 |
| JP | 62-191075 | 8/1987 |
| JP | 63-35658 | 2/1988 |
| WO | 93/01788 | 2/1993 |

* cited by examiner

*Primary Examiner*—James J. Seidleck
*Assistant Examiner*—Sanza McClendon
(74) *Attorney, Agent, or Firm*—Burr & Brown

(57) ABSTRACT

To provide a method for repairing a coated surface of a vehicle, using an ultraviolet curing resin having excellent quick-drying property, and giving a good finish in a shortened working time, a method for repairing the damage on a coated surface of a vehicle being a depression and/or a depletion of a coating film, which is characterized by comprising the following steps a) to c):

a) filling a putty raw material comprising an ultraviolet polymerizing resin composition in an optionally pretreated damage portion and ultraviolet curing the putty raw material to fill the damaged portion with the putty;

b) uniformly spray coating, on the coated surface including at least the putty-covered surface after the step a), a primer surfacer raw material comprising an ultraviolet polymerizing resin composition having a viscosity sufficient for spray coating and ultraviolet curing the obtained raw material coating film to form a primer surfacer layer; and c) applying a top coat on the primer surfacer layer obtained in b).

6 Claims, 3 Drawing Sheets

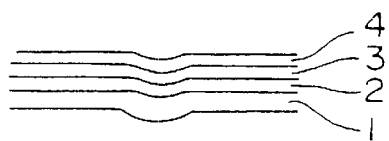
(i)
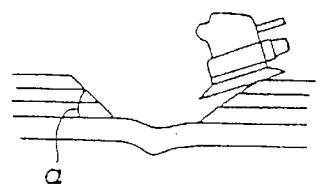
(ii)
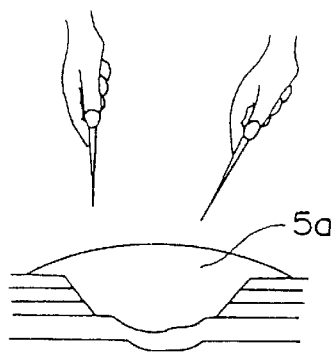
(iii)
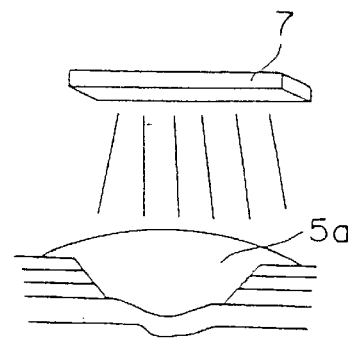
(iv)
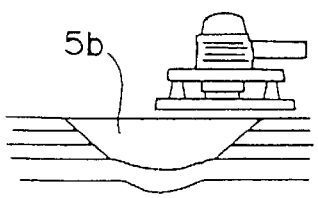
(v)
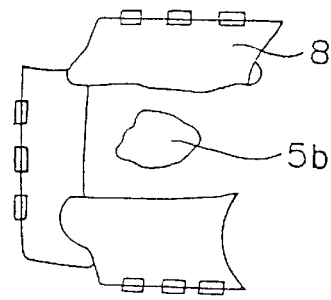
(vi)
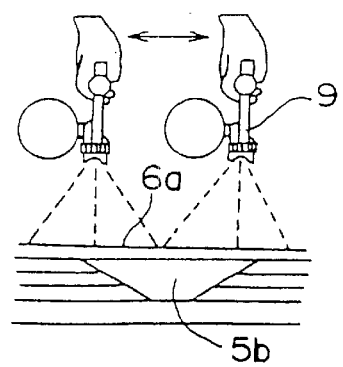
(vii)
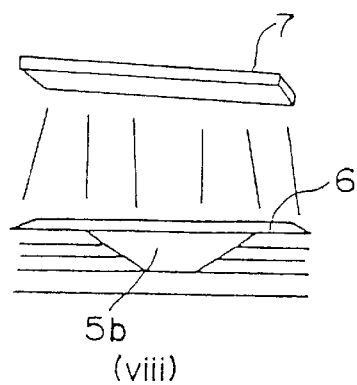
(viii)
F I G. 1

METHOD FOR REPAIRING THE COATED SURFACE OF A VEHICLE

CROSS REFERENCE TO RELATED APPLICATION

This is a divisional application of U.S. Ser. No. 09/388,749, filed Sep. 2, 1999, now allowed, the entirety of which is incorporated herein by reference.

BACKGROUND OF THE INVENTION

The present invention relates to a method for repairing the coated surface of a vehicle as well as to a resin composition for putty and a resin composition for a primer surfacer for repairing the coated surface of a vehicle. More particularly, it relates to a method for repairing the coated surface of a vehicle that utilizes an ultraviolet-curing resin having excellent quick-drying properties and provides a good finish in a shortened working time as well as to a resin composition for putty and a resin composition for a primer surfacer for repairing the coated surface of a vehicle.

Conventionally, as the method for repairing the scratches or depressions occurring on the coated surface of a vehicle such as an automobile, a method is generally used in which after forming a substrate that covers the damaged portion with a suitable combination of a metal surface treating agent, putties, an under coat, an intermediate coat and the like, finish coating with a top coat is performed thereon. Various resin compositions are used as the material for making the substrate above used in such a repairing method. Generally, usually several kinds of resin compositions are used. However, many of these resin compositions take a long time for curing or drying so that there is much waiting time, which causes a problem.

On the other hand, ultraviolet curing resins have been developed having a short curing time type resin. Also, studies on ultraviolet curing resins which can be used on the surface of a vehicle such as an automobile have been promoted. For example, Japanese Patent Publication No. Sho 60-30690 describes ultraviolet curing epoxy composition that can be used as a putty for automobiles. Furthermore, Japanese Patent Application Laid-open No. Sho 62-191075 describes use of an ultraviolet curing resin as a top coat that constitutes the outermost layer of the top coat film.

As described above, ultraviolet curing resins have been used in repairing the coated surface of a vehicle and the processability has been improved to some extent. However, there has been no report on substitution of all the materials used in the combination of putties, under coat, intermediate coat, etc. that constitutes the substrate by ultraviolet curing resins to improve the processability to a greater extent and obtain a finish comparable to one obtained by the conventional method. That is, as the method for repairing damages on the coated surface of a vehicle, at present no repairing method has been established that uses ultraviolet curing resins for all the materials in the substrate. Hence development of a repairing method has been desired that uses ultraviolet curing resins for all the materials in the substrate, gives a good finish and exhibits good processability.

SUMMARY OF THE INVENTION

Therefore, it is a primary objective of the present invention to provide a method for repairing the coated surface of a vehicle that uses an ultraviolet curing resin having excellent quick-drying properties and requires a shortened working time as well as a resin composition for putty and a resin composition for a primer surfacer for repairing the coated surface of a vehicle, comprising an ultraviolet curing resin that has excellent quick-drying properties and reactivity and has good usability.

The present inventors have made intensive research with a view to solving the above-described problem, and, as a result, they have found that use of a putty and a primer surfacer comprising ultraviolet curing resins having excellent quick-drying properties as materials for the substrate and for forming a primer surfacer layer uniformly on the portion where the putty is filled by spray coating respectively enables repair of the coated surface of a vehicle with a good finish and exhibits good processability, thus completing the present invention.

More particularly, the present invention is as follows:

A method for repairing a damage on a coated surface of a vehicle, the damage being a depression and/or a depletion of a coating film, comprising the steps of: filling a putty raw material comprising an ultraviolet polymerizing composition in an optionally pretreated damaged portion and ultraviolet curing the putty raw material to fill the damaged portion with the putty; uniformly spray coating, on the coated surface comprising at least the putty-covered surface after the step a), a primer surfacer raw material comprising an ultraviolet polymerizing composition having a viscosity sufficient for spray coating and ultraviolet curing the obtained raw material coating film to form a primer surfacer layer; and applying a top coat on the primer surfacer layer.

The method for repairing as above, in which the putty raw material used comprises an ultraviolet polymerizing composition containing an ultraviolet transmitting material and/or an ultraviolet absorbing material.

Further, the method for repairing as above, in which the primer surfacer raw material used comprises an ultraviolet polymerizing composition containing an ultraviolet transmitting material and/or an ultraviolet absorbing material.

The method for repairing in which the spray coating is performed by moving a spraying apparatus in a range where coating is contemplated while continuously spraying the primer surfacer raw material to practice spray coating of the raw material for more than two times on the same portion, removing the solvent from the spray coated raw material by forced drying, and repeating the operation alternately for more than two times.

The method for repairing in which a spray amount is 140 to 220 ml/min., a moving speed of the spraying apparatus is 75 to 90 cm/sec., and a distance from a spray nozzle of the spraying apparatus to a coating surface is 10 to 20 cm.

The method for repairing characterized in that the primer surfacer raw material comprises 6 to 22% by weight of an ultraviolet polymerizing prepolymer, 3 to 15% by weight of an ultraviolet polymerizing monomer, 1 to 11% by weight of an ultraviolet polymerization initiator, 26 to 43% by weight of a pigment, and 50 to 72% by weight of a solvent based on the total weight of the raw materials.

The method for repairing in which the primer surfacer layer has a thickness of a range from 40 to 300 μm.

The method for repairing characterized in that the putty raw material comprises 20 to 30% by weight of an ultraviolet polymerizing prepolymer, 15 to 30% by weight of an ultraviolet polymerizing monomer, 1 to 10% by weight of an ultraviolet polymerization initiator, and 40 to 60% by weight of a pigment based on the total weight of the raw materials.

A resin composition for a putty for repairing a coated surface of a vehicle, characterized by comprising an ultraviolet polymerizing prepolymer, an ultraviolet polymerizing monomer, an ultraviolet polymerization initiator, and an ultraviolet transmitting material and/or an ultraviolet absorbing material.

A resin composition for a primer surfacer for repairing a coated surface of a vehicle, characterized by comprising an ultraviolet polymerizing prepolymer, an ultraviolet polymerizing monomer, an ultraviolet polymerization initiator, a solvent and an ultraviolet transmitting material and/or an ultraviolet absorbing material.

The present invention can provide a method for repairing a coated surface of a vehicle that gives a good finish and requires a shorter working time.

BRIEF DESCRIPTION OF THE DRAWINGS

FIG. 1 is a figure illustrating the flow of process in a specific example of repairing a depression on a steel coated surface by the method for repairing of the present invention;

DETAILED DESCRIPTION OF THE PREFERRED EMBODIMENTS

Figure 2:
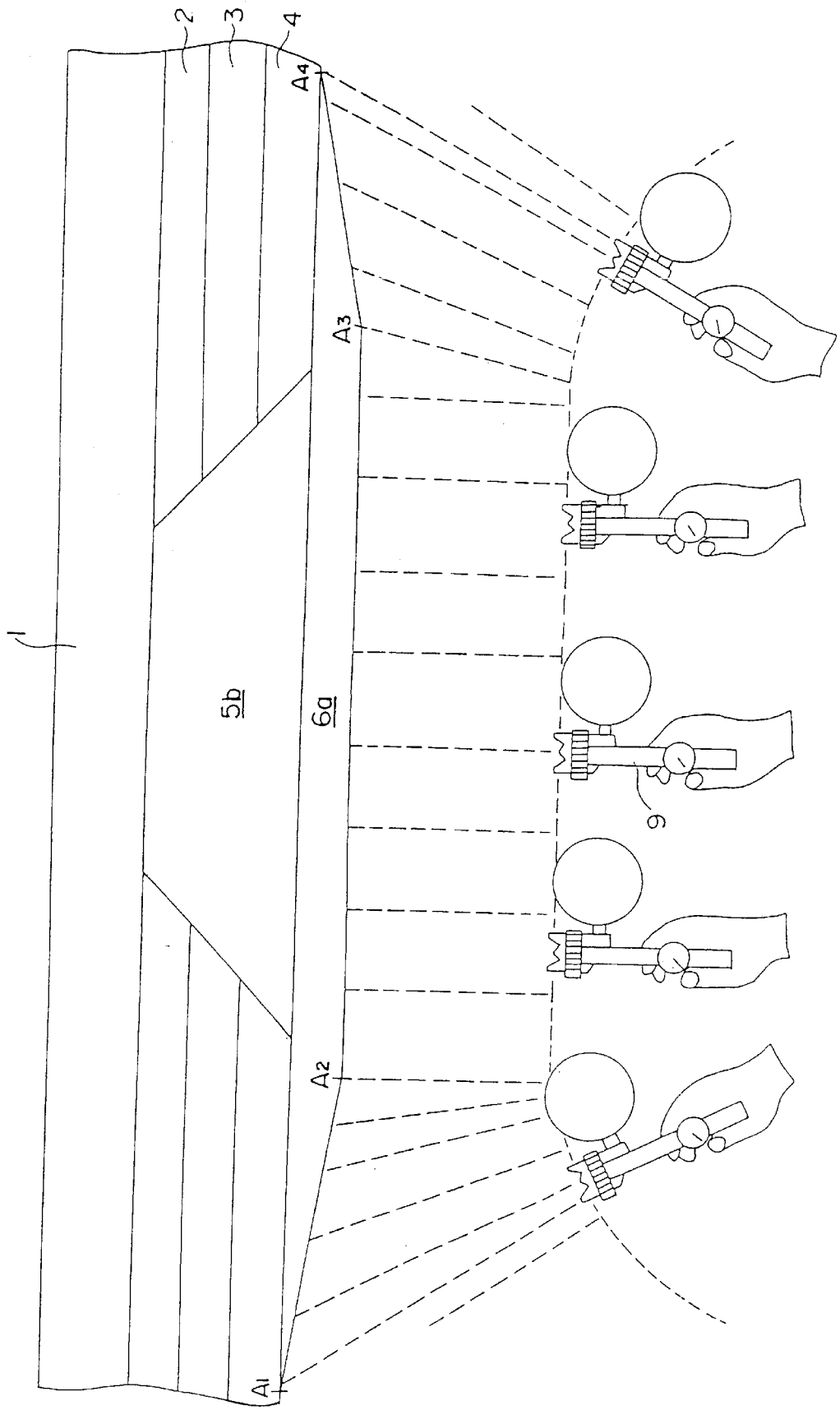
FIG. 2 is a figure illustrating details of the step of spray coating of a primer surfacer raw material shown in (vii) in FIG. 1.

Hereafter, the present invention will be described in detail.

The method for repairing of the present invention is comprised of a) the step of filling a putty, b) the step of forming a primer surfacer layer, c) the step of coating a top coat. Hereafter, each step will be described in detail in the order of a) to c).

In the step of filling putty, first, pretreatment is practiced in compliance with the state of a damaged portion. The pretreatment includes degreasing the coating film applied originally on a vehicle (hereafter, sometimes referred to as a old coating film), removing the old coating film, removing feather edges, etc.

The degreasing of the old coating film is a pretreatment that is practiced almost always in general repairing methods using no ultraviolet curing resin. Also in the repairing method of the present invention, degreasing is usually performed regardless of the state of damaged portion. The degreasing of the old coating film can be practiced by using generally used degreasing agent and treating according to the procedure generally performed.

Next, the removal of the old coating film, unlike the degreasing treatment, is a treatment practiced on the old coating film on the damaged portion and therearound in compliance with the state of damaged portion. In the case where the damage is a depression, the old coating film on a depressed portion is removed in most cases. In the case where the damage is a linear damage, a scratch damage, a damage by nail or the like, the old coating film has already been removed and a judgment is made as to whether or not the old coating film is to be removed further. Here, the removal of the old coating film is also a pretreatment conventionally performed so that it can be performed by a conventional method using an apparatus, for example, a disc sander, a double sander, or the like.

The operation of removing feather edges, which is an operation that is performed at the same time with the operation of removing the old coating film or after that operation, forms a gentle slope in a cross-section of the coated surface from the old coating film to an exposed steel plate surface or resin part surface after the removal of the old coating film. The angle of slope is generally approximately from 27 to 54 degrees. The operation of removing feather edges is also a conventional operation and the repairing method of the present invention may use the conventional method. The apparatus used here includes a double action sander and the like.

Thereafter, preferably, the old coating film removed surface and therearound are cleaned by air blowing or the like and then degreased.

In the present step, the optionally pretreated damaged portion is filled with a putty raw material comprising an ultraviolet polymerizing composition containing an ultraviolet transmitting material and/or an ultraviolet absorbing material and the raw material is cured by ultraviolet light to fill the damaged portion with the putty.

As the ultraviolet polymerizing composition used as a putty raw material in the repairing method of the present invention, there may be used without any particular limitation those compositions similar to the ultraviolet polymerizing composition generally used as a putty raw material for automobiles, etc. The ultraviolet polymerizing composition used as such a putty raw material contains an ultraviolet polymerizing prepolymer, an ultraviolet polymerizing monomer and an ultraviolet polymerization initiator as essential components, and a sensitizer, a pigment, a filler, a defoamer, a surface modifier, a solvent and the like as optional components.

In the repairing method of the present invention, the above-described ultraviolet polymerizing composition used as a putty raw material is preferably a resin composition obtained by blending an ultraviolet polymerizing composition generally used as a putty raw material for automobiles, etc. with an ultraviolet transmitting material and/or an ultraviolet absorbing material, more specifically, includes preferably the resin composition for a putty of the present invention containing an ultraviolet polymerizing prepolymer, an ultraviolet polymerizing monomer, an ultraviolet polymerization initiator, and an ultraviolet transmitting material and/or an ultraviolet absorbing material.

In the repairing method of the present invention, use of the putty raw material comprising an ultraviolet polymerizing composition containing the above-described ultraviolet transmitting material and/or ultraviolet absorbing material, in particular the resin composition for putty of the present invention allows rapid reaction of resin upon irradiation of ultraviolet rays to increase the processability.

In the present invention, the ultraviolet polymerizing prepolymer, ultraviolet polymerizing monomer and ultraviolet polymerization initiator contained in the resin composition for a putty may be those generally used as raw materials for a putty for automobiles, etc. without particular limitation.

The above-described ultraviolet polymerizing prepolymer specifically includes radical polymerization type prepolymers, for example, ester acrylates, urethane acrylates, epoxy acrylates, amino resin acrylates, acrylic resin acrylates, unsaturated polyesters, etc.; cation polymerization type prepolymers, for example, epoxy resins, resins having a vinyl ether; and thiol-ene addition type prepolymers obtained by a combination of an oligomer having an aryl group or an acryloyl group on the terminals of the molecule and a polythiol, and the like.

Furthermore, the ultraviolet polymerizing monomer specifically includes radical-based monomers such as 2-ethylhexyl acrylate, ethoxydiethylene glycol acrylate, phenoxyethyl acrylate, 2-hydroxypropyl acrylate, tetrahydrofurfuryl acrylate, dicyclopentenyl acrylate, neopentyl glycol diacrylate, polyethylene glycol diacrylate, bis(acryloxyethyl) bisphenol A, merimethylolpropane triacrylate, pentaerythritol triacrylate, and dipentaerythritol hexaacrylate, cation-based monomers such as vinyl cyclohexene monoxide, hydroxybutyl vinyl ether, cyclohexane dimethanol divinyl ether, cyclohexene diepoxide, and caprolactone polyol, etc.

The ultraviolet polymerization initiator specifically includes various carbonyl compounds as an initiator for radical polymerization systems, onium salts as an initiator for cation polymerization systems and the like. The initiator for thiol-ene addition type prepolymers includes initiators of hydrogen extraction type.

In the resin composition for a putty of the present invention, the blending proportion of the above-described ultraviolet polymerizing prepolymer, ultraviolet polymerizing monomer and ultraviolet polymerization initiator may be similar to the blending proportion when usually used as a raw material for a putty for automobiles.

The ultraviolet transmitting material and ultraviolet absorbing material contained in the resin composition for a putty of the present invention are not limited particularly so far as they are materials that transmit or absorb ultraviolet rays, respectively. In the present invention, preferably bluish purple to purple organic and inorganic pigments are used. Such a pigment specifically includes azo type pigments such as dioxazine compounds. In the repairing method of the present invention, when the ultraviolet transmitting material and ultraviolet absorbing material contained in the resin composition for a putty used is, for example, the above-described pigment, the putty is colored so that the state of proceeding of operation can be confirmed visually, which leads to an increase in processability. The ultraviolet transmitting material or ultraviolet absorbing material can be selected properly depending on the wavelength of the ultraviolet irradiation apparatus used. For example, when an ultraviolet irradiation apparatus having a peak of spectral energy at a wavelength of around 410 nm, a material that well transmits or absorbs ultraviolet rays having a wavelength of around 410 nm is preferably used as the above-described ultraviolet transmitting material or ultraviolet absorbing material.

In the resin composition for a putty of the present invention, the above-described ultraviolet transmitting material and/or ultraviolet absorbing material is specifically in a content of from about 1 to 30% by weight based on the total weight of the composition.

The resin composition for a putty of the present invention may contain in addition to the ultraviolet polymerizing prepolymer, ultraviolet polymerizing monomer, ultraviolet polymerization initiator, and ultraviolet transmitting material and/or ultraviolet absorbing material as essential components, a sensitizer, a pigment, a filler, a defoamer, a surface modifier, a solvent and the like as optional components. The resin composition for a putty of the present invention is preferably constituted by the ultraviolet polymerizing prepolymer, ultraviolet polymerizing monomer, ultraviolet polymerization initiator, and ultraviolet transmitting material and/or ultraviolet absorbing material as essential components, and a resin component that is non-reactive with each of the above-described components.

The resin composition for a putty of the present invention can be prepared by blending these essential components in a suitable proportion and further the above-described optional components in respective suitable amounts, as needed. The blending amounts of various components are selected properly depending on the kinds of the essential components to be used.

Furthermore, the resin composition for a putty used in the repairing method of the present invention is preferably an ultraviolet polymerizing composition containing about 20 to 30% by weight of an ultraviolet polymerizing prepolymer, about 15 to 30% by weight of an ultraviolet polymerizing monomer, about 1 to 10% by weight of an ultraviolet polymerization initiator, and about 40 to 60% by weight of a pigment based on the total weight of the raw materials. Moreover, the pigment used in the above-described ultraviolet polymerizing composition is not limited particularly so long as it is a pigment. Generally, an extender pigment such as calcium carbonate, barium sulfate, clay, talc, tonoko (iron oxide-containing clay being levigated), white carbon, and balloon.

Moreover, the formulation of resin composition for a putty of the present invention specifically includes a formulation, for example, having blended therein 65 to 98% by weight of the composition containing about 20 to 30% by weight of an ultraviolet polymerizing prepolymer, about 15 to 30% by weight of an ultraviolet polymerizing monomer, about 1 to 10% by weight of an ultraviolet polymerization initiator, and about 40 to 60% by weight of a pigment based on the total weight of the raw materials, about 1 to 30% by weight of an ultraviolet transmitting material and/or ultraviolet absorbing material, and about 1 to 5% by weight of the non-reactive resin. The ultraviolet polymerizing prepolymer, ultraviolet polymerizing monomer, ultraviolet polymerization initiator, pigment, ultraviolet transmitting material and/or ultraviolet absorbing material and non-reactive resin may be separately added and mixed together.

Further, when the ultraviolet transmitting material and/or ultraviolet absorbing material used is the above-described organic or inorganic-pigment of from bluish purple to purple, the value indicated as the content of the pigment in the resin composition for a putty is a quantity that does not include them. Furthermore, in addition to the above-described organic or inorganic pigment of from bluish purple to purple used as the ultraviolet transmitting material and/or ultraviolet absorbing material, the pigment used in the above-described resin composition for a putty generally includes extender pigments such as calcium carbonate, barium sulfate, clay, talc, tonoko (iron oxide-containing clay being levigated), white carbon, and balloon.

By containing the ultraviolet transmitting material and/or ultraviolet absorbing material, the resin composition for a putty of the present invention enables more efficient utilization of energy by the irradiation of ultraviolet rays than the conventional ultraviolet curing type resin composition not containing them, that is, enables curing with less amount of ultraviolet irradiation, to thereby shorten curing time to increase the efficiency of work in the repairing of the coated surface of vehicles.

In the present invention, such a putty raw material, preferably the resin composition for a putty of the present invention, is filled in the damaged site on the coated surface of a vehicle that has been pretreated if needed. The filling of the putty raw material can be performed in the same manner as the conventional method. In a preferred method, a slightly greater amount than the volume to be filled is selected as the filling amount of a putty raw material and this is filled dividedly in several times. First time, a suitable portion of the filling amount is filled in the above-described damaged site with a plastic spatula in such a manner as to squeeze it. Moreover, the remainder portion of the filling amount is divided into suitable portions and coated in a superimposing manner with a plastic spatula so as not to entrain air. After the filling of the putty raw material, the finishing appears somewhat elevated in the putty raw material filled portion relative to the old coating film surface and the thickness of the putty raw material in the putty filled portion is thicker by about 0.1 to 1 mm than the thickness of the old coating film. Therefore, the thickness of the putty raw material filled portion is roughly 0.4 to 3 mm depending on the thickness of the old coating film.

After completion of the filling the patty raw material, ultraviolet rays are irradiated on the filled portion to cure the patty raw material, which is an ultraviolet polymerizing composition. The irradiation of ultraviolet rays can be performed using an apparatus for generating light containing ultraviolet rays, for example, an UV lamp or the like. The length of the time of irradiating ultraviolet rays required for curing the ultraviolet polymerizing composition is, for example, roughly from 30 seconds to 60 seconds in case of using the preferred composition in the present invention as the putty raw material and setting the filling thickness in the above-described range and irradiating a sufficient amount of ultraviolet rays.

As a result of the irradiation of ultraviolet rays, the patty raw material cures and the damaged portion that has been pretreated as needed is filled with the putty. Here, it may sometimes be the case that when the volume of the putty raw material is decreased more or less by curing, the elevation of the putty from the old coating film surface becomes more or less decreased than before the curing.

Thereafter, the putty surface elevated from the old coating film surface is ground to the level of the old coating film surface using a double action sander, orbital sander or the like. The putty filling step is completed therewith. However, in the case where a sufficiently smooth surface is not obtained after the first putty filling step, or the like, second putty filling may be performed on the first filled putty in the same manner as described above.

In the repairing method of the present invention, then, a primer surfacer layer is formed on the coated surface including a putty making-up surface after the first step in the following manner.

In the first step of the repairing method of the present invention, it is preferred to use a putty raw material comprising an ultraviolet polymerizing composition containing an ultraviolet transmitting material and/or ultraviolet absorbing material.

The primer surfacer layer is formed on the putty filled in the step above. On this occasion, it is preferred that a primer surfacer layer is formed also around the border of the putty and the old coating film. The primer surfacer layer is formed preferably such that it has a constant thickness, and the its thickness on the putty and around the border between the putty and the old coating film is the thickest, and its thickness is decreased gradually according as the position is increasingly remoter from around the border.

The primer surfacer layer can be obtained by uniformly spray coating, on a coated surface including at least putty making-up surface after the step a), a primer surfacer raw material comprising an ultraviolet polymerizing composition that may contain an ultraviolet transmitting material and/or ultraviolet absorbing material and has a viscosity sufficient for enabling spray coating, and ultraviolet curing the resulting raw material coating film.

Before forming the primer surfacer layer, preferably the putty making-up surface and the old coating film therearound is cleaned and further degreased by air blowing, etc.

In the repairing method of the present invention, the ultraviolet polymerizing composition used as the primer surfacer raw material is not limited particularly so long as it is an ultraviolet polymerizing composition that has a viscosity enabling uniform spray coating and the primer surfacer layer after curing has good adhesion with the top coat formed on the putty or primer surfacer layer.

Such an ultraviolet polymerizing composition contains an ultraviolet polymerizing prepolymer, an ultraviolet polymerizing monomer, an ultraviolet polymerization initiator, and a solvent as essential components, and as optional components an ultraviolet transmitting material, an ultraviolet absorbing material, a sensitizer, a pigment, a filler, an anti-settling agent, a defoamer, a surface modifier, etc.

In the present invention, the above-described primer surfacer used is preferably the resin composition for primer surfacer of the present invention containing an ultraviolet polymerizing prepolymer, an ultraviolet polymerizing monomer, an ultraviolet polymerization initiator, a solvent, and an ultraviolet transmitting material and/or ultraviolet absorbing material.

Specific examples of the ultraviolet polymerization prepolymer, ultraviolet polymerization monomer and ultraviolet polymerization initiator contained in the resin composition for a primer surfacer of the present invention include the same compounds as the specific examples of these components contained in the above-described resin composition for a putty of the present invention.

In the resin composition for a primer surfacer of the present invention, the blending proportion of the above-described ultraviolet polymerizing prepolymer, ultraviolet polymerizing monomer and ultraviolet polymerization initiator may be similar to the blending proportion when usually used as a raw material for a primer surfacer for automobiles, etc.

Specific examples of the ultraviolet transmitting material and ultraviolet absorbing material contained in the resin composition for a primer surfacer of the present invention include the same compounds as the specific examples of these components contained in the resin composition for a putty. Furthermore, in the resin composition for a primer surfacer of the present invention, the above-described ultraviolet transmitting material and/or ultraviolet absorbing material is in a content of specifically from about 1 to 30% by weight based on the total weight of the composition.

The resin composition for a primer surfacer of the present invention can be prepared by blending these essential components in a suitable proportion and further the optional components such as a sensitizer, a pigment, a filler, an anti-settling agent, a defoamer, and a surface modifier in respective suitable amounts, as needed. The blending amounts of various components are selected properly depending on the kinds of the essential components to be used.

The resin composition for a primer surfacer of the present invention is preferably constituted by the ultraviolet polymerizing prepolymer, ultraviolet polymerizing monomer, ultraviolet polymerization initiator, a solvent, and ultraviolet transmitting material and/or ultraviolet absorbing material as essential components and a resin component that is non-reactive with each of the above-described components.

Furthermore, the resin composition for a primer surfacer used in the repairing method of the present invention is preferably composition containing 6 to 22% by weight of an ultraviolet polymerizing prepolymer, 3 to 15% by weight of an ultraviolet polymerizing monomer, 1 to 11% by weight of an ultraviolet polymerization initiator, 26 to 43% by weight of a pigment, and 50 to 72% by weight of a solvent based on the total weight of the raw materials. The pigment used in the above-described ultraviolet polymerizing composition for a primer surfacer is not limited particularly so long as it is a pigment. Generally, a combination of an extender pigment and a coloring pigment is used.

Alternatively, the resin composition for a primer surfacer of the present invention can be prepared from a resin composition for a primer surfacer that can be prepared to have the above-described preferred formulation by adding a solvent in a suitable time, for example, at the time of performing spray coating. For example, the resin composition for a primer surfacer having a preferred formulation used in the repairing method of the present invention can be prepared by adding to a composition containing 10 to 30% by weight of an ultraviolet polymerizing prepolymer, 5 to 20% by weight of an ultraviolet polymerizing monomer, 2 to 15% by weight of an ultraviolet polymerization initiator, 40 to 60% by weight of a pigment, and 15 to 30% by weight of a solvent based on the total weight of the raw materials, 40 to 50 parts by weight of a solvent per 100 parts by weight of the above-described composition, followed by mixing.

Moreover, the formulation of resin composition for a primer surfacer of the present invention specifically includes a formulation having blended therein about 65 to 98% by weight of the composition containing about 10 to 30% by weight of an ultraviolet polymerizing prepolymer, about 5 to 20% by weight of an ultraviolet polymerizing monomer, about 2 to 15% by weight of an ultraviolet polymerization initiator, about 40 to 60% by weight of a pigment, and from about 15 to 30% by weight of a solvent based on the total weight of the raw materials, about 1 to 30% by weight of an ultraviolet transmitting material and/or ultraviolet absorbing material, and about 1 to 5% by weight of the non-reactive resin, as a raw material for a resin composition for a primer surfacer, and 45 to 50 parts per 100 parts by weight of the raw material. The ultraviolet polymerizing prepolymer, ultraviolet polymerizing monomer, ultraviolet polymerization initiator, pigment, solvent, ultraviolet transmitting material and/or ultraviolet absorbing material, and non-reactive resin may be separately added and mixed together.

Further, when the ultraviolet transmitting material and/or ultraviolet absorbing material used is the above-described organic or inorganic pigment of bluish purple to purple, the value indicated as the content of the pigment in the resin composition for a putty is a amount that does not include the ultraviolet transmitting material and ultraviolet absorbing material. Furthermore, in addition to the above-described organic or inorganic pigment of bluish purple to purple used as the ultraviolet transmitting material and/or ultraviolet absorbing material, the pigment used in the above-described resin composition for a putty generally includes extender pigments such as calcium carbonate, barium sulfate, clay, talc, tonoko (iron oxide-containing clay being levigated), white carbon, and balloon.

Furthermore, the resin composition for a primer surfacer of the present invention can be prepared from a stock solution of resin composition for a primer surfacer that can be prepared to have the above-described preferred formulation by adding a solvent in a suitable time, for example, at the time of performing spray coating.

For example, the resin composition for a primer surfacer used in the repairing method of the present invention can be prepared also by adding to a composition comprising 65 to 98% by weight of a composition containing about 10 to 30% by weight of an ultraviolet polymerizing prepolymer, about 5 to 20% by weight of an ultraviolet polymerizing monomer, about 2 to 15% by weight of an ultraviolet polymerization initiator, about 40 to 60% by weight of a pigment, and about 15 to 30% by weight of a solvent based on the total weight of the raw materials, about 1 to 30% by weight of an ultraviolet transmitting material and/or ultraviolet absorbing material, and about 1 to 5% by weight of a non-reactive resin, as a stock solution of resin composition for a primer surfacer, 45 to 50 parts by weight of a solvent per 100 parts by weight of the above-described stock solution of the composition, followed by mixing at the time of spray coating. The ultraviolet polymerizing prepolymer, ultraviolet polymerizing monomer, ultraviolet polymerization initiator, pigment, solvent, ultraviolet transmitting material and/or ultraviolet absorbing material and non-reactive resin may be separately added and mixed together.

The solvent contained in the resin composition for a primer surfacer of the present invention may be any solvent that is usually used in ultraviolet polymerizing composition without any particular limitation. Such a solvent includes water and organic solvents. The organic solvents include specifically hydrocarbons such as gasoline, kerosene, normal hexane, toluene, xylene, and oil of turpentine, ketones such as acetone, methyl isobutyl ketone, methyl ethyl ketone, and cyclohexanone, alcohols such as cyclohexanol, butyl alcohol, isopropyl alcohol, ethyl alcohol, and methyl alcohol, halogenated hydrocarbons such as methylene chloride and trichloroethylene, esters such as ethyl acetate, isobutyl acetate, and butyl acetate.

By containing the ultraviolet transmitting material and/or ultraviolet absorbing material, the resin composition for a primer surfacer of the present invention enables more efficient utilization of energy by the irradiation of ultraviolet rays than the conventional ultraviolet curing type resin composition not containing them, that is, enables curing with less amount of ultraviolet irradiation, to thereby shorten curing time to increase the efficiency of work in the repairing of the coated surface of vehicles. Furthermore, when the resin composition for a primer surfacer of the present invention contains the ultraviolet transmitting material and ultraviolet absorbing material as the above-described pigment, the primer surfacer is colored so that the state of proceeding of operation can be confirmed visually, which leads to an increase in processability.

In the repairing method of the present invention, such primer surfacer raw material, preferably the resin composition for a primer surfacer of the present invention is spray coated uniformly on the coated surface including at least a putty making-up surface after the step a).

Before the spray coating, around the portion where spray coating is contemplated is masked if needed. Masking can be performed in the same manner as the method usually used in spray coating in repairing the coated surface of automobiles, etc.

The repairing method of the present invention is not limited particularly so long as the raw material can be sprayed uniformly onto the coated surface but is performed preferably by moving a spraying apparatus in a range where coating is contemplated while continuously spraying the primer surfacer raw material to practice spray coating of the raw material for more than two times on the same spot, removing the solvent from the spray coated raw material by forced drying, and repeating the operation alternately for more than two times.

The spray amount in the above-described spray coating method is specifically about 140 to 220 ml/min., preferably about 140 to 180 ml/min. Furthermore, the moving speed of the spraying apparatus in the above-described spray coating method is specifically about 75 to 90 cm/second, preferably about 80 to 85 cm/second. Moreover, the distance between the spray nozzle of the spraying apparatus and the coated surface is specifically 10 to 20 cm, preferably 10 to 15 cm.

The spraying apparatus used in the above-described spray coating method is specifically a spray gun or the like. Furthermore, the bore diameter of the spray nozzle of the spraying apparatus is preferably about 0.8 to 1.5 mm, more preferably about 1.2 to 1.3 mm.

Furthermore, in the above-described spray coating method, the film thickness of the primer surfacer raw material coating film obtained by spray coating and forced drying of the solvent at a time is set to preferably about 10 to 150 μm, more preferably about 20 to 125 μm.

When the putty raw material comprising an ultraviolet polymerizing composition containing an ultraviolet transmitting material and/or ultraviolet absorbing material is used above, or a primer surfacer raw material comprising an ultraviolet polymerizing composition containing an ultraviolet transmitting material and/or ultraviolet absorbing material is used, the film thickness of the primer surfacer raw material coating film obtained by spray coating and forced drying of the solvent at a time is set to preferably about 10 to 60 μm, more preferably about 20 to 50 μm.

To set the film thickness of the primer surfacer raw material coating film in the above-described range, spray coating may be performed with the number of spraying on the same spot under the above-described preferred spray coating conditions being set to be about 3 to 8 times. The film thickness of the thus spray coated coating film before drying is about 1.1 to 1.2 times of the film thickness after drying. The forced drying of the solvent, depending on the film thickness, may be performed by drying for about 20 to 60 seconds using an air drier or the like to sufficiently remove the solvent, if the film thickness after the spray coating in (I) above is in the above-described range.

Moreover, it is preferred that the direction of spraying is perpendicular to the coated surface. Therefore, the movement of the above-described spraying apparatus is preferably performed in parallel to the coated surface with the spray nozzle being directed perpendicular to the coated surface. Here, as described above, when the primer surfacer layer is to be formed such that the coated film has a constant thickness and is the thickest on the putty and around the border between the putty and the old coating film and its thickness is decreased gradually according as the position is increasingly remoter from around the border, then the spraying apparatus is translated horizontally for a portion of which the thickness is to be formed at a constant value and the spraying apparatus may be moved such that the spray nozzle gradually moves away from the coated surface along an arcuate curve for a portion of which the layer is to be formed so as to have a thickness that becomes gradually thinner.

In the above-described spray coating method, spray coating and forced drying of the solvent are made as a set and the number of sets to be performed depends on the thickness of the primer surfacer layer to be obtained finally. Here, in the repairing method of the present invention, the thickness of the primer surfacer layer is practically about 40 to 300 μm, more preferably about 60 to 165 μm.

The thickness of the primer surfacer layer practically is about 120 to 300 μm, more preferably about 120 to 165 μm, when a putty raw material comprising an ultraviolet polymerizing composition containing neither ultraviolet transmitting material nor ultraviolet absorbing material is used in the first step above and a primer surfacer raw material comprising an ultraviolet polymerizing composition containing neither ultraviolet transmitting material nor ultraviolet absorbing material is used in the second step above. To set the thickness of the primer surfacer layer in such a range, it is preferred that the above-described set be repeated about 2 to 3 times.

Further, the above-described set can be repeated in quite the same manner, but it is possible to adjust the film thickness, drying time, etc. of spray coating in each time. A preferred method includes a spray coating method in which the film thickness of the first spray coating is about 40 to 55% of the film thickness of the second or subsequent spray coating and to the same at the second or subsequent spray coating.

For example, when coating and drying are repeated 3 times in order to obtain a film thickness of 120 to 140 μm for the primer surfacer layer, assuming the spray amount is 140 ml/min. and the moving speed of the spraying apparatus is 85 cm/second, operation may be performed such that the number of spraying onto the same spot in the first spray coating is made 3 to 4 times, for example, by ¾ pattern superimposing or the like and drying for about 20 seconds using an air drier or the like to form a coating film of 20 to 30 μm thick and in the second spray coating, the number of spraying onto the same spot is made 7 to 8 times, for example, by ⅞ pattern superimposing or the like and drying for about 30 seconds using an air drier or the like to form a coating film of 50 to 55 μm thick on the first coating film, and performing the third spray coating and drying in the same manner as the second time to form a coating film of 50 to 55 μm on the coating film in the second time.

Furthermore, the thickness of the primer surfacer layer in the repairing method of the present invention is practically about 40 to 120 μm, more preferably about 60 to 80 μm, when the putty raw material comprising an ultraviolet polymerizing composition containing an ultraviolet transmitting material and/or ultraviolet absorbing material is used in the first step or the primer surfacer raw material comprising an ultraviolet polymerizing composition containing an ultraviolet transmitting material and/or ultraviolet absorbing material is used in the second step. To make the primer surfacer layer to have a thickness in such a range, it is preferred that the above-described set be repeated about 2 to 3 times.

Further, the above-described set can be repeated in quite the same manner, but it is possible to adjust the film thickness, drying time, etc. of spray coating in each time. A preferred method includes a spray coating method in which the film thickness of the first spray coating is made about 40 to 55% of the film thickness of the second or subsequent spray coating.

For example, when coating and drying are repeated 2 times in order to obtain the thickness of primer surfacer layer of 60 to 80 μm, assuming the spray amount is 140 ml/min. and the moving speed of the spraying apparatus is 85 cm/second, operation may be performed such that the number of spraying on the same spot in the first spray coating is made 3 to 4 times, for example, by ¾ pattern superimposing or the like and solvent removal for about 20 to 30 seconds using an air drier or the like to form a coating film of 20 to 30 µm thick and in the second spray coating, the number of spraying onto the same spot is made 7 to 8 times, for example, by ⅞ pattern superimposing or the like and drying for about 45 to 60 seconds using an air drier or the like to form a coating film of 40 to 50 µm thick on the first coating film.

As described below, the volume of the primer surfacer raw material is decreased more or less by curing so that the thickness of the resulting primer surfacer layer is also decreased more or less as compared with the film thickness of the primer surfacer raw material coating film before the curing. Therefore, it is necessary to set the film thickness of the primer surfacer raw material coating film before the curing taking into consideration the reduction ratio due to the curing.

After completion of the spray coating the primer surfacer raw material, ultraviolet rays are irradiated on the portion where the raw material is coated to cure the primer surfacer raw material, which is an ultraviolet polymerizing composition. The irradiation of ultraviolet rays can be performed using an apparatus for generating light containing ultraviolet rays, for example, a UV lamp or the like. The length of the time of irradiating ultraviolet rays required for curing the ultraviolet polymerizing composition is, for example, roughly from 30 to 60 seconds in case of using the preferred composition in the present invention as the putty raw material and setting the filling thickness in the above-described range and irradiating a sufficient amount of ultraviolet rays.

As a result of the irradiation of ultraviolet rays, the primer surfacer raw material cures to form a primer surfacer layer. Thereafter, the primer surfacer layer is ground with a paper or the like by a sander. With this, the primer surfacer layer forming step is completed. In the case where strain remains after the step of forming the first primer surfacer layer, further another primer surface layer may be formed on the first primer surface layer in the same manner as described above.

In the repairing method of the present invention, next a top coat is applied as described below on the primer surfacer layer formed as described above.

In the second step in the repairing method of the present invention, it is preferred to use a primer surfacer raw material comprising an ultraviolet polymerizing composition containing an ultraviolet transmitting material and/or ultraviolet absorbing material.

Before the top coating, it is preferred that the primer surfacer layer and the old coating film surface therearound be cleaned using an air blow or the like and further degreasing.

The top coating in the repairing method of the present invention can be performed in the same manner as the top coating method usually used in repairing the coated surface of a vehicle etc. For example, a coating is applied by selecting a suitable coating method from a solid coating method, a metallic coating method, a 3 coat mica coating method, etc. in compliance with the old coating film. Then, the coated surface is finished by polishing, etc.

The repairing method of the present invention is a method for repairing the damages on the coated surface of a vehicle and the damages to which the present method is applied are depressions and/or depletion of the coating film. Furthermore, the repairing method of the present invention is applicable to various vehicles such as bicycles, automobiles, and heavy machine vehicles and, as for coated surface, to both a coated surface coated on a steel plate or the like and to a coated surface coated on a resin parts made of various resins, for example, polypropylene, polyurethane, ABS resin, polycarbonate, etc. From the viewpoint of degree of damages, the repairing method of the present invention can be applied more effectively to depressions of within 4 mm in depth and within 1 dB (10 cm×10 cm) in area. Furthermore, as for the depletion of the coating film, the repairing method of the present invention can be applied more effectively to a linear damage, a scratch damage, a damage by nail or the like within 30 cm in length.

The resin composition for a putty and resin composition for a primer surfacer of the present invention are preferably applied to repairing the coated surface of a vehicle advantageously and it is expected that use in the repairing method of the present invention exhibits their effects more significantly. Furthermore, the resin composition for a putty and resin composition for a primer surfacer of the present invention singly or in combination are widely applicable in repairing the coated surface of furniture, construction materials in addition to the coated surface of vehicles, and in the field where usually ultraviolet polymerizing compositions are used.

Hereafter, the repairing method of the present invention as described above will be described by specific examples.

First, an example of repairing depressions on a steel coated surface will be explained referring to FIGS. 1 and 2.

FIG. 1 is a figure illustrating the flow of process in the repairing method and FIG. 2 is a figure illustrating the method of spray coating primer surfacer raw material.

FIG. 1-(i) is a cross-sectional view showing a depressed portion on the coated surface of a steel plate. On a steel plate 1 are applied an under coat layer 2, an intermediate coat layer 3, and a top coat layer 4 (hereafter, these 3 layers together are sometimes referred to as a old coating film) in order and the state of a depression over the old coating film to the steel plate 1 is shown. To repair the depression, first, degreasing of the old coating film is performed though not shown in the Figure. Next, the old coating film in the depressed portion is removed by using paper of about #60 to #80 in a disc sander, a double sander, or the like and thereafter, the operation of removing feather edges is performed as illustrated in FIG. 1-(ii). The operation of removing the feather edges is performed by using paper of about #120 to #400 in a double action sander or the like. On this occasion, the angle α of the feather edge can be set to 27 to 54 degrees. After removing the feather edges, the old coating film-removed portion and therearound are cleaned by air blowing and degreased with a waste, etc. impregnated with silicon-off or the like.

Next, using the resin composition for a putty whose formulation is shown in Table 1 below as a putty raw material and a small amount portion thereof is squeezed onto the bottom of the old coating film-removed portion obtained as described above using a plastic spatula. Thereafter, as shown in FIG. 1-(iii), the putty raw material 5a is filled in the old coating film-removed portion dividedly in several times taking care not to entrain air. When the old coating film-removed portion is full of the putty raw material and the surface of the putty raw material is extruded slightly from the surrounding old coating film surface, the filling of the putty raw material is stopped.

TABLE 1

| Component | Blending amount (% by weight) |
| --- | --- |
| ultraviolet polymerizing prepolymer | 23.1 |
| ultraviolet polymerizing monomer | 20.6 |
| ultraviolet polymerization initiator | 1.8 |
| extender pigment | 54.5 |

Note that the ultraviolet polymerizing prepolymer shown in Table 1 is a prepolymer consisting of epoxy acrylate and unsaturated polyester and the extender pigment is a pigment comprising talc, calcium carbonate and balloon.

Figure 3:
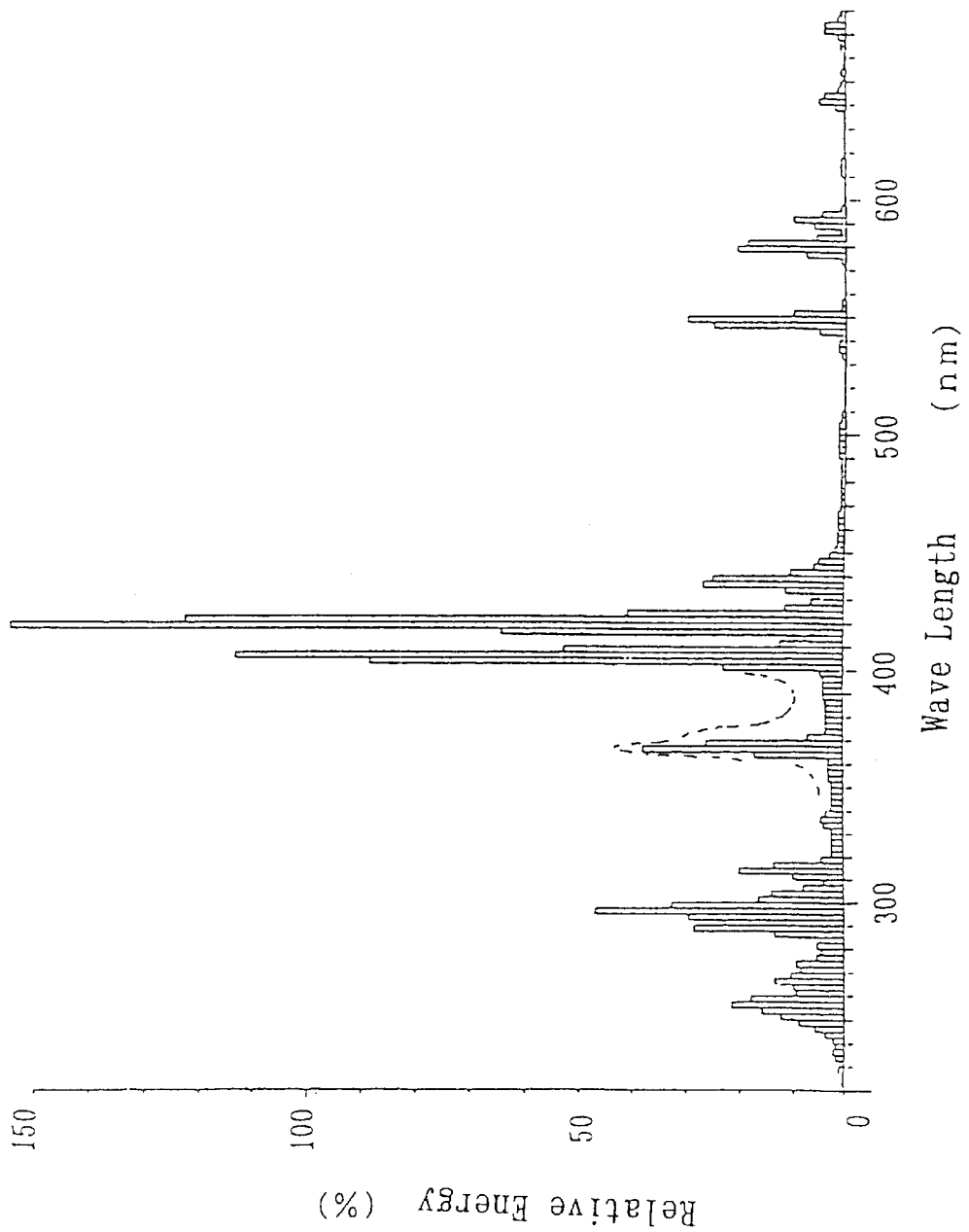
FIG. 3 is a figure illustrating the spectrum energy distribution of an exemplified irradiated light from the ultraviolet irradiation apparatus used in the method for repairing of the present invention.

After completion of the filling of the putty raw material, to cure the putty raw material, ultraviolet rays are irradiated using an ultraviolet rays irradiation apparatus 7 onto the filled putty raw material 5a. On this occasion, the ultraviolet rays irradiation apparatus 7 includes an apparatus equipped with a 1.2 kW metal halide lamp having spectral energy at each wavelength as shown in FIG. 3 in relative amounts as a UV lamp. Irradiation of ultraviolet rays using such an apparatus can cure the putty raw material 5a in only about 30 to 60 seconds even from a position at a distance of about 10 to 20 cm.

The portion of the putty 5b cured by irradiation of ultraviolet rays protruded above the old coating film surface is ground to the level of the old coating film surface by using a double action sander, an orbital sander or the like as shown in FIG. 1-(v) and further by manual grinding or the like. Then, the putty making-up surface and a peripheral portion around the border between the putty making-up surface and the old coating film are masked using a masking paper 8 as shown in FIG. 1-(vi) before the primer surfacer raw material can be spray coated thereon.

Then, a stock solution of the resin composition for a primer surfacer whose formulation is shown in Table 2 is diluted with a proper thinner such that stock solution of the resin composition for a primer surfacer: thinner=100:40 to 50 (weight ratio) to prepare a resin composition for a primer surfacer (1).

TABLE 2

| Component | Blending amount (% by weight) |
| --- | --- |
| ultraviolet polymerizing prepolymer | 13.4 |
| ultraviolet polymerizing monomer | 6.6 |
| ultraviolet polymerization initiator | 2.0 |
| extender pigment | 54.0 |
| colored pigment | 2.0 |
| toluene | 13.7 |
| methyl isobutyl ketone | 2.0 |
| methyl ethyl ketone | 2.0 |
| isopropyl alcohol | 2.0 |
| methyl alcohol | 2.0 |
| anti-setting agent | 0.3 |

Note that the ultraviolet polymerizing prepolymer shown in Table 2 is a prepolymer comprising an epoxy acrylate, and the extender pigment is a pigment comprising talc and calcium carbonate. The resin composition for a primer surfacer prepared as described above is spray coated on a peripheral portion around the border between the putty making-up surface and the old coating film as illustrated in FIG. 1-(vii).

Separately, the stock solution of the resin composition for a primer surfacer is diluted with a proper thinner such that stock solution thinner=100:45 to 50 (weight ratio) to prepare a resin composition for a primer surfacer (2) or the present invention. This is spray coated on a peripheral portion around the border between putty making-up surface and the old coating film, masked in the same manner as in Specific Example 1. In the instant Specific Example 2, the putty raw material used is a general putty raw material usually used in repairing the coated surface of vehicles and the primer surfacer raw material used is the resin composition for a primer surfacer (2) of the present invention containing an ultraviolet transmitting material and/or ultraviolet absorbing material that transmits or absorbs ultraviolet rays at a wavelength around 410 nm.

TABLE 3

| Component | Blending amount (% by weight) |
| --- | --- |
| ultraviolet polymerizing prepolymer | 18.8 |
| ultraviolet polymerizing monomer | 13.5 |
| ultraviolet polymerization initiator | 2.0 |
| xylene polymer | 2.0 |
| extender pigment | 49.0 |
| dioxadine compound (azo-based pigment) | 2.1 |
| toluene | 8.4 |
| methyl isobutyl ketone | 4.0 |
| surfant | 0.2 |

Note that the ultraviolet polymerizing prepolymer in Table 3 is a prepolymer comprising epoxy acrylate and the extender pigment is a calcium carbonate-based pigment.

FIG. 2 is a diagram illustrating the details of spray coating method and the spray coating method will be explained referring thereto. A spray gun 9 provided with a nozzle having a bore diameter of 1.3 mm is adjusted for its discharging amount to about 140 ml/min. As the spray gun 9, for example, a commercially available Pack 530 Gun-IV (manufactured by Iwata), Iwata Spray Gun W-88 (manufactured by Iwata), etc. may be used. Spray coating is performed by adjusting air pressure to 0.8 to 1.0 kgf/cm and setting the distance from the coated surface to about 10 cm.

FIG. 2 illustrates the primer surfacer raw material coating film in a state where it is formed such that it has a constant thickness and the thickest on the putty and around the border between the putty and the old coating film and its thickness is decreased gradually according as the position is increasingly remoter from around the border. In FIG. 2, the portion between $A_2$ and $A_3$ and is a portion where the primer surfacer raw material coating film on the putty and around the border between the putty and the old coating film has a constant thickness and the portions between $A_1$ and $A_2$, the portion between $A_3$ and $A_4$ are portions where the thickness of the primer surfacer raw material coating film is gradually decreased according as the position is increasingly remoter from around the border. Note that $A_1$ and $A_4$ are ends of the above-described coating film.

In the portion between $A_2$ and $A_3$ the spray nozzle is directed perpendicular to the coated surface and the spray gun is translated horizontally at a moving speed of 85 cm/second with the trigger thereof being pulled, i.e., in a state of continuous spraying. In the portions between $A_1$ and $A_2$ and the portion between $A_3$ and $A_4$, respectively, the spraying apparatus may be moved such that the spray nozzle gradually moves away from the coated surface in an arcuate form from the points $A_2$ and $A_3$ to the points $A_1$ and $A_4$. On this occasion, the trigger of the spray gun is released just before the pints $A_1$ and $A_4$. This operation is repeated such that the spray coating is repeated 3 to 4 times on the same spot. Then, the primer surfacer raw material coating film is forcibly dried for about 20 seconds using an air drier to remove the solvent.

Furthermore, the spray coating of the primer surfacer raw material using the above-described spray gun and forced drying of the primer surfacer raw material using an air drier are repeated twice in the same manner as described above except that the spray coating on the same spot is performed 7 to 8 times and the drying time is 30 seconds to complete the spray coating of the primer surfacer raw material.

Then, to cure the coating film made from the primer surfacer raw material 6a, ultraviolet rays are irradiated from the ultraviolet irradiation apparatus 7 onto the above-described primer surfacer raw material coating film. On this occasion, the ultraviolet irradiation apparatus 7 used includes an apparatus equipped with a 1.2 kW metal halide lamp whose spectral energy at each wavelength is shown relatively in FIG. 3 as described above as an UV lamp. Irradiation of ultraviolet rays using such an apparatus can cure the primer surfacer raw material coating film in only about 30 to 60 seconds even from a position at a distance of from about 10 to 20 cm. The curing operation results in the formation of a primer surfacer layer of 60 to 140 µm in thickness.

Here, when a change in thickness of the primer surfacer layer is desired, the bore diameter, discharging amount, dilution ratio of the stock solution for primer surfacer raw material, number of repeated spraying in a single spray coating operation, number of spray coating operation, etc. may be properly adjusted. Concomitantly, the length of the time of forced drying and the time for irradiating ultraviolet rays may be changed properly.

Thereafter, the surface of the primer surfacer layer is ground with #400 and then with #600 to 800. After the grinding, a strain removing spray is used to confirm if there is a strain. If a strain is found, the step of forming the primer surfacer layer is repeated once again. If no strain is found, the strain removing spray is wiped out and the top coating step is to be conducted.

In the top coating step, first cleaning and degreasing are performed and top coating is performed by the general method, followed polishing by the general methods.

As described above, the depressions on a coated surface of a steel plate are repaired by the repairing method of the present invention.

Next, only the differences of the repairing method for linear damages, scratch damages and damages by nails or the like on the coated surface of a steel plate from the repairing method for depressions, i.e., the treating method for the old coating film will be described.

In the case where the damage is linear damage, scratch damage, damage by nails, etc., the operation of removing the old coating film is or is not performed. When no operation of removing the old coating film is carried out, it is only where the old coating film is a coating film for a new car or urethane coating film. In all the other cases, operation of removing the old coating film will be conducted. Note that the judgement about the old coating can be conducted according to the general method, for example, by judging permeability of lacquer thinner, visual observation, thermoplastic property, etc.

When no operation of removing the old coating film is carried out, the repairing method as described above is applicable. Furthermore, when the operation of removing the old coating film is performed, the operation of removing feather edges in the same manner as described above without removing the old coating film by a disc sander, a double sander or the like. Otherwise the repairing method as described above is applicable.

Furthermore, only the differences of the repairing method for the depressions, linear damages, scratch damages, damages by nails or the like on the coated surface of the resin parts from the repairing method for depressions, i.e., the treating method for the old coating film will be described.

First, the repairing of the depressions on the coated surface of resin parts can be performed in quite the same manner as the repairing of the depressions on the coated surface of steel plates. In the case of linear damages, scratch damages, damages by nails, etc., the old coating film in the repairing of the depressions in the coated surface of the steel plate, quite the same repairing method as described above can be applied except that the old coating film is cut into a V-shape with a knife instead of the operation of removing the old coating film by use of a disc sander and removing feather edges thereof.

The repairing method of the present invention as described above is to improve the defects of the conventional method for repairing the coated surface of vehicles in that not all of the layers constituting the substrate could not be constituted by ultraviolet curing resin compositions having excellent quick-drying property since they are poor in finish, adhesion, etc. That is, the repairing method for the coated surface of vehicles is characterized by using a substrate constituted by a putty and a primer surfacer only, each being formed form an ultraviolet curing resin composition having excellent quick-drying property by unique methods. There can then be provided a method for repairing the coated surface of a vehicle which reduces working time greatly and gives a good finish.

Furthermore, in the substrate portion of the repaired coated surface obtained by the method of the present invention, the interlayer adhesion between the putty and primer surfacer layer is sufficient and the adhesion between the putty and the surface of a metal such as steel plate or the surface of various resin parts is good and the adhesion between the primer surfacer and top coat has no problem. For other performances, it is by no means inferior to the substrate portion of the repaired coated surface according to the conventional method. Moreover, the adhesion between the putty used in the present invention with resin parts, particularly polypropylene parts, which need a special primer when bonded to conventional putties, is improved to such an extent that no problem occurs without any primer, which is a great feature of the substrate portion of the repaired coated surface obtained by the method of the present invention.

What is claimed is:

1. A resin composition for a putty for repairing a coated surface of a vehicle, said resin composition comprising about 20 to about 30% by weight of an ultraviolet polymerizing prepolymer, about 15 to about 30% by weight of an ultraviolet polymerizing monomer, 1 to about 10% by weight of an ultraviolet polymerization initiator, and about 40 to about 60% by weight of a pigment.

2. A resin formulation for a primer surfacer for repairing a coated surface of a vehicle, said resin formulation comprising about 100 parts by weight of a resin composition and about 40 to about 50 parts by weight of a solvent; said resin composition comprising: about 10 to about 30% by weight of an ultraviolet polymerizing prepolymer, about 5 to about 20% by weight of an ultraviolet polymerizing monomer, about 2 to about 15% by weight of an ultraviolet polymerization initiator, about 40 to about 60% by weight of a pigment, and about 15 to about 30% by weight of a solvent.

3. A formulation of resin composition for a putty, said formulation comprising about 65 to about 98% by weight of a resin composition as recited in claim 1, about 1 to about 30% by weight of an ultraviolet transmitting material and/or ultraviolet absorbing material, and about 1 to about 5% by weight of non-reactive resin.

4. A resin formulation for a primer surfacer for repairing a coated surface of a vehicle, said resin formulation comprising: about 6 to about 22% by weight of an ultraviolet polymerizing prepolymer, about 3 to about 15% by weight of an ultraviolet polymerizing monomer, about 1 to about 11% by weight of an ultraviolet polymerization initiator, about 26 to about 43% by weight of a pigment, and about 50 to about 64 parts by weight of a solvent.

5. A resin formulation for a primer surfacer for repairing a coated surface of a vehicle, said resin formulation comprising about 65 to about 98% by weight of a resin composition, about 1 to about 30% by weight of an ultraviolet transmitting material and/or ultraviolet absorbing material, and about 1 to about 5% by weight of non-reactive resin; said resin composition comprising: about 10 to about 30% by weight of an ultraviolet polymerizing prepolymer, about 5 to about 20% by weight of an ultraviolet polymerizing monomer, about 2 to about 15% by weight of an ultraviolet polymerization initiator, about 40 to about 60% by weight of a pigment, and about 15 to about 30% by weight of a solvent.

6. A resin formulation for a primer surfacer for repairing a coated surface of a vehicle, said resin formulation comprising about 100 parts by weight of a stock solution and about 45 to about 50 parts by weight of a solvent; said stock solution comprising about 65 to about 98% by weight of a resin composition, about 1 to about 30% by weight of an ultraviolet transmitting material and/or ultraviolet absorbing material, and about 1 to about 5% by weight of non-reactive resin; said resin composition comprising: about 10 to about 30% by weight of an ultraviolet polymerizing prepolymer, about 5 to about 20% by weight of an ultraviolet polymerizing monomer, about 2 to about 15% by weight of an ultraviolet polymerization initiator, about 40 to about 60% by weight of a pigment, and about 15 to about 30% by weight of a solvent.

* * * * *

UNITED STATES PATENT AND TRADEMARK OFFICE
CERTIFICATE OF CORRECTION

PATENT NO. : 6,617,370 B2  Page 1 of 1
DATED : September 9, 2003
INVENTOR(S) : Makoto Ueno It is certified that error appears in the above-identified patent and that said Letters Patent is hereby corrected as shown below:

Column 9,
Line 7, please change "72%" to -- 64% --.

Signed and Sealed this

Seventeenth Day of February, 2004

JON W. DUDAS
*Acting Director of the United States Patent and Trademark Office*